UNITED STATES PATENT OFFICE.

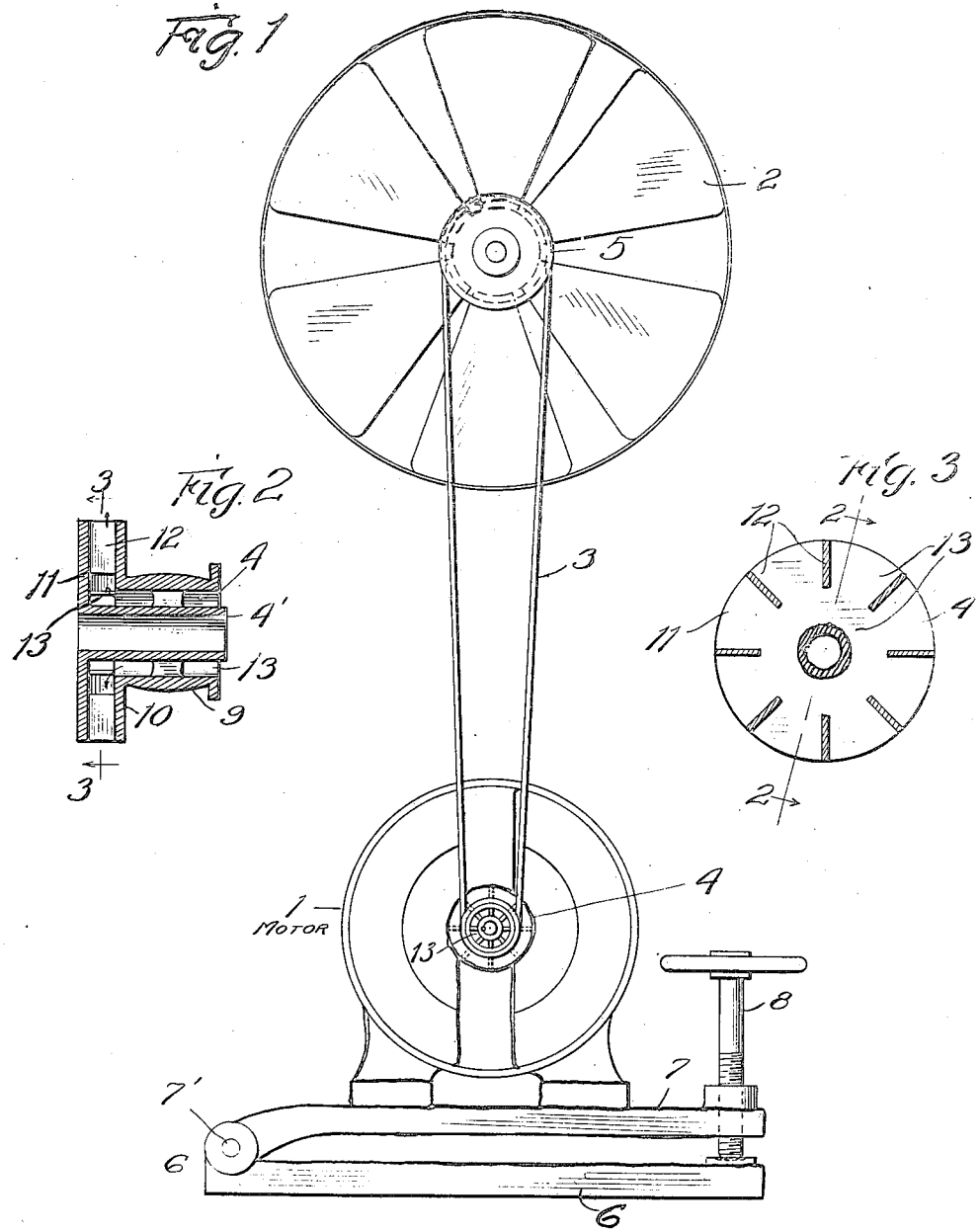

AUSTIN KIMBLE, OF WAUSAU, WISCONSIN, ASSIGNOR TO MARATHON ELECTRIC MFG.
COMPANY, OF WAUSAU, WISCONSIN, A CORPORATION OF WISCONSIN.

VARIABLE-SPEED POWER-TRANSMITTING DEVICE.

1,372,700.    Specification of Letters Patent.    Patented Mar. 29, 1921.

Application filed May 12, 1919. Serial No. 296,647.

*To all whom it may concern:*

Be it known that I, AUSTIN KIMBLE, a citizen of the United States of America, and a resident of Wausau, county of Marathon, and State of Wisconsin, have invented certain new and useful Improvements in Variable-Speed Power-Transmitting Devices, of which the following is a specification.

This invention relates to speed regulation of motor-driven devices and more particularly to means for manually adjustable regulation of the speed of a motor-driven device by means of variable belt tension, especially in connection with constant speed motors such for instance as alternating current motors of either synchronous or induction type.

The main objects of the invention are to provide for adjustable belt slippage whereby the speed of the driven machine may be varied relative to the speed of a motor by means of varying the belt slippage by a suitable belt tightener; to provide an improved form of pulley adapted for ventilation and consequent cooling sufficient to avoid excessive heating; and to provide a motor with such a pulley adapted to prevent over-heating of the motor.

An illustrative embodiment of this invention is shown in the accompanying drawings, in which—

Figure 1 is a front elevation of a belt-connected motor and fan.

Fig. 2 is an axial section of the ventilated motor pulley on the line 2—2 of Fig. 3.

Fig. 3 is a section through said pulley on the line 3—3 of Fig. 2.

In the construction shown in the drawings, the motor 1 is operably connected to the fan 2 by means of the belt 3, said motor being provided with a pulley 4, and the fan being provided with a pulley 5 to receive said belt. The motor is mounted on an adjustable frame 6 comprising a stationary base part 6' and a movable part or platform 7 adapted and arranged for vertical movement by adjustable means 8 in the form of a screw and hand-wheel, said parts 6' and 7 being hinged together at one side as indicated at 7'. The driven pulley is so positioned relative to the motor pulley, that movement of the screw 8 varies the tension of the belt by reason of changing the distance between the pulley centers. Turning the screw 8 backward or counter-clockwise lowers the motor 4 and tightens the belt thereby decreasing slippage and increasing the speed of the fan, and vice versa.

It will be apparent that if the motor is adapted for constant speed and the driven device is in the form of a fan or other constant load mechanism, the tension of the belt may be adjusted to run the driven device at any constant speed desired less than its maximum speed. The ventilated pulley 4 comprises a hub 4', a rim 9 secured thereto by a spider in the usual manner, a radial flange 10 formed on the back-side of rim 9, a radial flange 11 formed on the rear end of hub 4' and extending beyond the outer edge of flange 10, and radially disposed blades 12 disposed between said flanges, a plurality of air draft passages 13 being disposed between the spider arms and said flanges whereby, in operation, a strong draft of air is drawn in at the outer end of the pulley and discharged radially past the blades 12.

Ordinarily, the motor pulley is smaller than the driven pulley, and hence the slippage naturally occurs at the motor end of the belt, but in case the driven pulley is the smaller, the pulleys are made of such materials that slippage at the motor is assured, for which purpose the driven pulley may have the face of its rim formed of material offering greater surface friction than that of the motor pulley.

It is apparent that if the fan is adjusted for slow speed and correspondingly light load, the tension on the belt will be relatively small and consequently the bearing friction of the motor and fan will be correspondingly small, so that on light loads there is a saving of energy which would otherwise be lost through the bearings of a constantly tight-belted device.

Although but one specific embodiment of this invention has been herein shown and described, it will be understood that numerous details of the construction shown may be altered or omitted without departing from the spirit of this invention as defined by the following claims.

I claim:

1. An air cooled pulley comprising a hub, a belt rim radially spaced from said hub, a spider connecting said hub and rim to support the latter, axially spaced radial flanges on said hub and rim respectively at one end of the pulley, and radially disposed vanes positioned between said flanges.

2. A pulley having a radially disposed air passageway at one end formed and arranged to admit air centrally and to discharge the same outwardly in a radial direction, said passageway being of discoidal shape and provided with vanes to propel the air.

Signed at Chicago this 9th day of May, 1919.

AUSTIN KIMBLE.